Feb. 12, 1957 J. M. CABANISS 2,780,887
BAIT HOLDER
Filed June 24, 1955
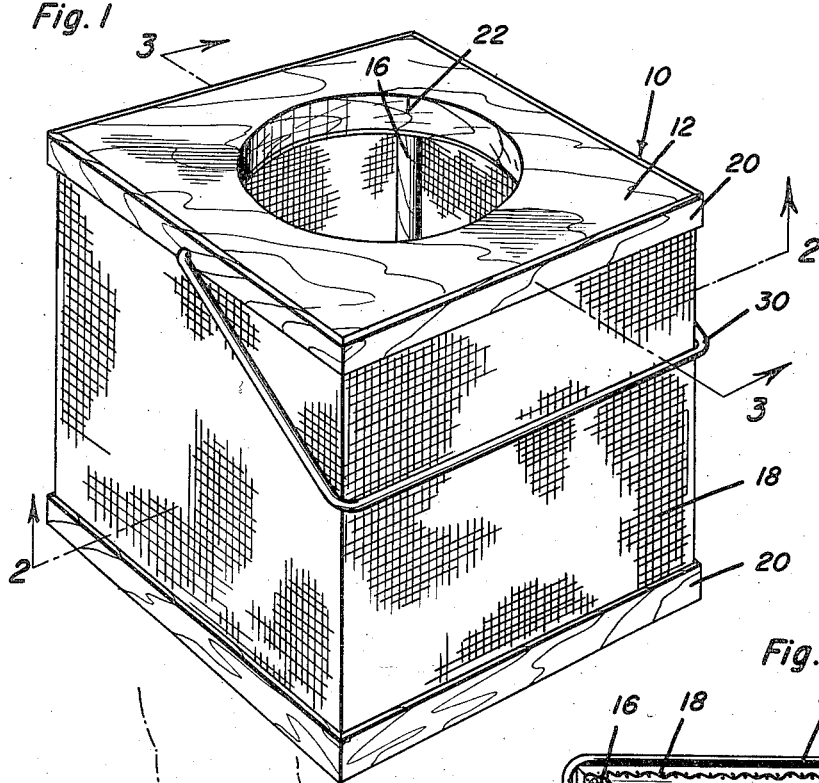
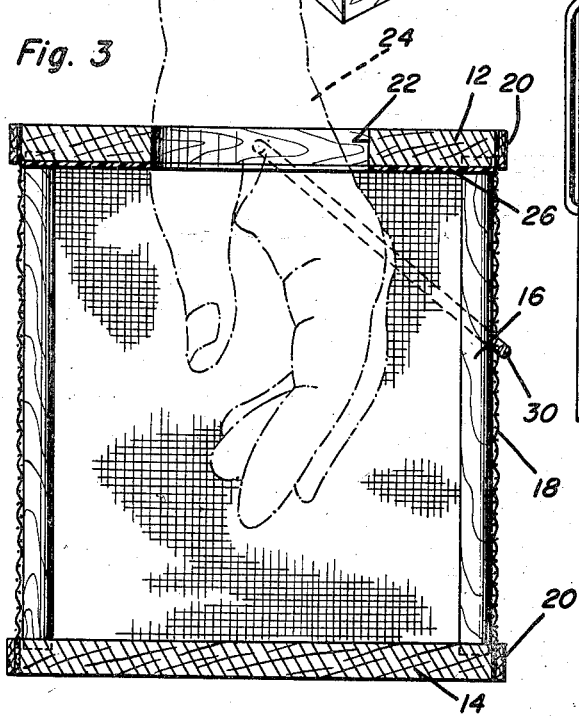
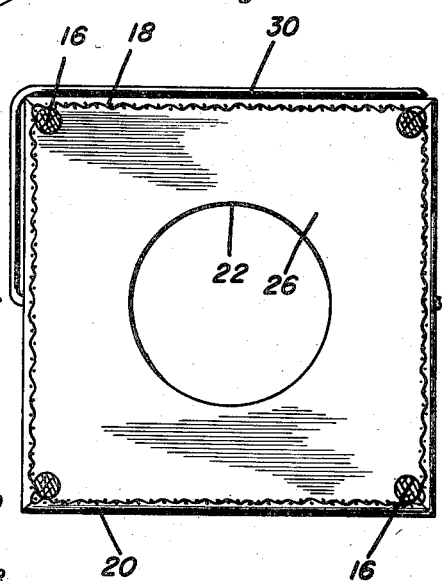
James M. Cabaniss
INVENTOR.

United States Patent Office 2,780,887
Patented Feb. 12, 1957

2,780,887

BAIT HOLDER

James M. Cabaniss, Tuscaloosa, Ala.

Application June 24, 1955, Serial No. 517,723

3 Claims. (Cl. 43—55)

This invention relates generally to a bait holder, and more specifically provides a device for retaining live insects such as crickets, beetles or the like in readily accessible position for fishermen wherein individual insects may be selected and used as bait when desired.

In fishing, various types of bait may be utilized, such as live insects including crickets, beetles or the like. These insects are necessarily retained in live condition until such time as they are used, wherein it is then desirable that the insects be readily accessible for use by the fisherman. Previously, bait holders have included various arrangements including complicated structures and receptacles with various types of closures wherein it requires two hands to grasp an insect. Other attempts have been made to permit grasping of insects by use of a single hand, but all of these devices have failed in that certain areas of the receptacle or bait holder are normally inaccessible. These inaccessible areas are generally adjacent the top of the container, and it is normal that the majority of the insects in a receptacle will congregate adjacent the top. Accordingly, it is the primary object of the present invention to provide an insect bait holder having an enlarged opening therein to permit the free passage of a fisherman's hand wherein the device is so constructed that insects cannot gain access to the opening and cannot leave the enclosure formed by the bait holder.

In carrying out the above object, the enlarged opening is so arranged that the insects necessarily have to climb to reach this opening, and the opening is surrounded with an extremely smooth surface to prevent gripping of such surface by the insects, thereby preventing climbing of the insects to retain the insects in the enclosure.

Another object of the present invention is to provide a bait holder which is extremely simple in construction, easy to use, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the bait holder of the present invention;

Figure 2 is a plan sectional view taken substantially upon a plane passing along section line 2—2 of Figure 1 viewing the undersurface of the top of the container; and Figure 3 is a vertical, sectional view taken substantially upon a plane passing along section line 3—3 of Figure 1 illustrating the details of construction of the container and the relationship of the hand passing through the enlarged opening.

With reference to the official drawings, the numeral 10 generally designates the receptacle type bait holder of the present invention which includes a top wall 12, a bottom wall 14 secured in spaced parallel relation by four corner posts or rod-like members 16 secured to the top and bottom walls 12 and 14 by any suitable means. In surrounding relation to the four corner posts 16 as well as the top and bottom walls 12 and 14 is a continuous wire screen mesh member 18 which forms four side walls of the receptacle 10. Surrounding the periphery of the top wall 12 and the bottom wall 14 is a strip of material 20 covering the raw edges of the screen material 18 which may be secured by any suitable fastening means in the desired position.

The top wall 12 is provided with an enlarged circular opening 22 of sufficient size to permit movement of a person's hand 24 therethrough with very little effort. Secured to the complete undersurface of the top wall 12 is a member of plastic material 26 having an extremely smooth surface. The plastic material 26 is also provided with an opening corresponding to the opening 22 in the top wall 12 to permit passage of the hand 24.

Insects and especially crickets that will be employed for bait by fishermen will be positioned in the receptacle 10 by inserting the same through the opening 22 wherein the screen 18 and the opening 22 permits circulation of air to the crickets for retaining them in live condition and the screen 18 permits visual observation of the crickets to facilitate the grasping of a cricket by a fisherman. The crickets cannot have access to the opening 22 unless they climb along the undersurface of the top wall 12. Due to the smooth and slick condition of the plastic coating 26 adjacent the opening 22, the crickets cannot gain access to the said opening and will thereby be retained within the receptacle 10 until such time as a person extends his hand 24 therethrough for grasping a selected cricket for use. The plastic material 26 must extend for a distance equal at least to the maximum reach of the crickets, thereby assuring that they cannot reach the opening 22. Also, the distance from the bottom wall 14 to the opening 22 should be somewhere near the distance of jumping of the crickets.

It will be understood that the top and bottom walls 12 and 14 may be constructed of suitable wood, or the top wall 12 may be constructed of plastic material thereby making it waterproof, and the screen member 18 may extend around one, two, three or four walls as desired, and the size is optional but must be within the limits set forth above. If desired, a U-shaped bail handle may be provided for carrying the device, and such handle is designated by the numeral 30.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bait holder comprising a receptacle including a bottom wall, side walls and a top wall forming an enclosure for retaining insects, at least one of said side walls being constructed of mesh material to permit circulation of air to the insects for maintaining the insects alive, said top wall having an enlarged opening to permit passage of a person's hand to permit grasping of an insect, said top wall having an unobstructed smooth surface on the inner face thereof in surrounding relation to the aperture to prevent insects from moving along the inner face of the top wall thereby preventing insects from approaching the aperture and retaining the insects in the receptacle, said inner face of the top wall having a covering of smooth plastic material forming the smooth surface.

2. A live insect retaining device comprising an enclosure having an enlarged opening therein, said opening being of sufficient size to permit passage of a person's hand to grasp selected insects, said opening being located for necessitating climbing movement of the insects to gain access to the opening, and a smooth surface surrounding said opening and preventing the insects from gaining access to the opening, said smooth surface including a coating of plastic material extending for a distance at least equal to the length of reach of the insects, said opening being disposed in the top of an enclosure with the smooth surface disposed in substantially a horizontal plane with the area adjacent the opening being free of obstructions to permit movement of a person's hand to any area of the enclosure.

3. A holder for live insects capable of crawling and projecting themselves in flight for a limited distance, said holder comprising an enclosure having a bottom, a top and a peripheral wall of mesh material for permitting circulation of air for the insects, the entire interior of the enclosure being free of obstructions, said bottom and peripheral wall being constructed of material capable of providing traction for the insects, said top having an enlarged opening therein with the opening being sufficiently large to permit free movement of a person's hand into the interior of the enclosure thus permitting access to any point in the enclosure, said top having an undersurface of smooth material incapable of providing traction to the insects thereby preventing egress of insects through said opening.

References Cited in the file of this patent

UNITED STATES PATENTS

| | | |
|---|---|---|
| 400,460 | Jennings | Apr. 2, 1889 |
| 1,140,625 | Spitzler | May 25, 1915 |
| 2,346,744 | Glassman | Apr. 18, 1944 |
| 2,620,588 | Critser | Dec. 9, 1952 |
| 2,763,091 | Mann | Sept. 18, 1956 |